United States Patent
Mashima et al.

(10) Patent No.: US 9,767,469 B2
(45) Date of Patent: Sep. 19, 2017

(54) CUSTOMER-CENTRIC ENERGY USAGE DATA SHARING

(71) Applicant: FUJITSU LIMITED, Kawasaki-shi, Kanagawa (JP)

(72) Inventors: Daisuke Mashima, Sunnyvale, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 1100 days.

(21) Appl. No.: 13/942,995

(22) Filed: Jul. 16, 2013

(65) Prior Publication Data
US 2015/0025934 A1    Jan. 22, 2015

(51) Int. Cl.
*G06Q 30/02* (2012.01)

(52) U.S. Cl.
CPC ................ *G06Q 30/0201* (2013.01)

(58) Field of Classification Search
CPC ...................................................... G06Q 30/00
See application file for complete search history.

(56) References Cited

U.S. PATENT DOCUMENTS

| | | | | |
|---|---|---|---|---|
| 2008/0104407 A1* | 5/2008 | Horne | ...................... | G06F 21/64 713/178 |
| 2008/0177678 A1* | 7/2008 | Di Martini | ............. | G01D 4/002 705/412 |
| 2010/0106342 A1* | 4/2010 | Ko | ......................... | G06Q 10/04 700/295 |
| 2010/0324962 A1* | 12/2010 | Nesler | .................. | G01R 21/133 705/7.36 |
| 2011/0239113 A1* | 9/2011 | Hung | .................... | G06F 19/322 715/271 |
| 2012/0284096 A1* | 11/2012 | Gomes | ................... | G06Q 50/06 705/14.14 |
| 2012/0296799 A1* | 11/2012 | Playfair | ................. | G06Q 10/00 705/37 |
| 2012/0331567 A1* | 12/2012 | Shelton | .............. | G06F 21/6245 726/28 |
| 2014/0067142 A1* | 3/2014 | Steven | ................... | G06Q 10/00 700/291 |

OTHER PUBLICATIONS

Mashima et al. "Enabling Robust Information Accountability in E-healthcare Systems." In Proc. of USENIX HealthSec Dec. 2012.
Mashima et al. "Enhancing Accountability of Electronic Health Record Usage via Patient-centric Monitoring." In Proc. of ACM IHI Jan. 2012.
The Laws of Identity. http://www.identityblog.com/stories/2004/12/09/thelaws.html, May 11, 2005.

(Continued)

*Primary Examiner* — Eric Netzloff
(74) *Attorney, Agent, or Firm* — Maschoff Brennan

(57) ABSTRACT

A method of sharing energy usage data may include requesting customer-specific energy usage data (CSEUD). The method further includes receiving a modified CSEUD record. The modified CSEUD record includes modified energy usage data with respect to original energy usage data of an original CSEUD record from which the modified CSEUD record is derived. The method also includes authenticating the modified CSEUD record to verify the integrity of the modified energy usage data.

16 Claims, 4 Drawing Sheets

(56) References Cited

OTHER PUBLICATIONS

D. Bauer, D. M. Blough, and D. Cash, "Minimal Information Disclosure with Efficiently Verifiable Credentials". In Digital Identity Management, Oct. 31, 2008.

D. Bergman, D. Jin, J. Juen, N. Tanaka, C. Gunter, and A. Wright, "Non-Intrusive Load Shed Verification" Pervasive Computing, IEEE (vol. 10, Issue: 1) Jan.-Mar. 2011, pp. 49-57.

G. Hart. "Nonintrusive appliance load monitoring" Proceedings of the IEEE (vol. 80, Issue: 12, Dec. 1992.

D. Mashima and M. Ahamad. Enabling Robust Information Accountability in E-healthcare Systems . In 3rd USENIX Workshop on Health Security and Privacy, Aug. 2012.

R. C. Merkle. Protocols for public key cryptosystems. In IEEE Symposium on Security and Privacy, 1980.

R. C. Merkle. "A certified digital signature". CRYPTO, pp. 218-238, 1998.

A. Mohan, D. Bauer, D. M. Blough, M. Ahamad, B. Bamba, R. Krishnan, L. Liu, D. Mashima, and B. Palanisamy. "A Patient-centric, Attribute-based, Source-verifiable Framework for Health Record Sharing" 2009.

P. Mohan, A. Thakurta, E. Shi, D. Song, and D. E. Culler. "Gupt: privacy preserving data analysis made easy". In SIGMOD Conference, May 2012.

E. Shi, T.-H. H. Chan, E. G. Rie_el, R. Chow, and D. Song. Privacy-Preserving Aggregation of Time-Series Data, Aug. 2011.

Izu, Tetsuya, et al. "PIATS: A partially Sanitizable Signature Scheme." Information and Communications Security. Springer Berlin Heidelberg, 2005. 72-83.

Daisuke Mashima & Mustaque Ahamad, Enabling Robust Information Accountability in E-healthcare Systems, In Proc. of the 3rd USENIX Workshop on Health Security and Privacy (HealthSec 2012), Bellevue, WA, 2012.

Izu, Tetsuya et al., "PIATS: A Partially Sanitizable Signature Scheme." Information and Communications Security. Springer Berlin Heidelberg, 2005, 72-83.

Daisuke Mashima & Mustaque Ahamad, Enabling Robust Information Accountability in E-Healthcare Systems, In Proc. of the 3rd USENIX Workshop on Health Security and Privacy (HeathSec 2012), Bellevue, WA, 2012.

* cited by examiner

CUSTOMER-CENTRIC ENERGY USAGE DATA SHARING

FIELD

The embodiments discussed herein are related to a customer-centric energy usage data sharing.

BACKGROUND

Utility companies often incentivize reduction in energy usage during certain high load periods to ensure the utility can meet the demand. For example, in summer months peak energy usage may occur on hot days in the late afternoon. The utility may offer an incentive to a factory to reduce energy usage during the late afternoon to ensure the utility can meet the demand during the peak energy usage. In response, the factory may delay a high load production run until later in the evening. The changes in energy usage during peak or high load periods may be referred to as a demand response (DR) event. DR events may include a time period during which the utility expects a high demand and asks customers to reduce or curtail energy usage. When a customer reduces its energy usage by an agreed upon amount, the utility may provide the incentive to the customer.

Recently, several types of DR event systems have developed to manage DR events. Generally, the DR event systems communicate the DR events and energy curtailment requirements that pertain to the DR event to the customer. Additionally, the DR event systems track and assess compliance with the DR event by the customer and/or handles distribution of incentives to the customers in exchange for compliance with the DR event. In some DR systems, DR aggregators mediate communication between utilities and customers and substantially handle notification, tracking, assessment, and distribution of incentives.

For example, DR aggregators may be included in capacity bidding programs (CBP) and demand bidding programs (DBP), which are implemented by several major utility companies. In CBP and DBP, a DR aggregator submits a curtailment commitment to a utility and sends curtailment requests to DR participants (e.g., customers). Based on the actual curtailment accomplished and the committed amount, the DR aggregator may receive an incentive from the utility and distribute the incentive or some portion thereof to the customers.

To assess the compliance of each customer, the DR aggregator tracks energy usage data. The energy usage data may include energy consumption levels, time information, energy usage background information, etc. The energy usage data may therefore include data that may reveal private information about the customer or otherwise may introduce privacy concerns for the customer.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of sharing energy usage data. The method may include requesting customer-specific energy usage data (CSEUD). The method may further include receiving a modified CSEUD record. The modified CSEUD record may include modified energy usage data with respect to original energy usage data of an original CSEUD record from which the modified CSEUD record is derived. The method may also include authenticating the modified CSEUD record to verify the integrity of the modified energy usage data.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1:
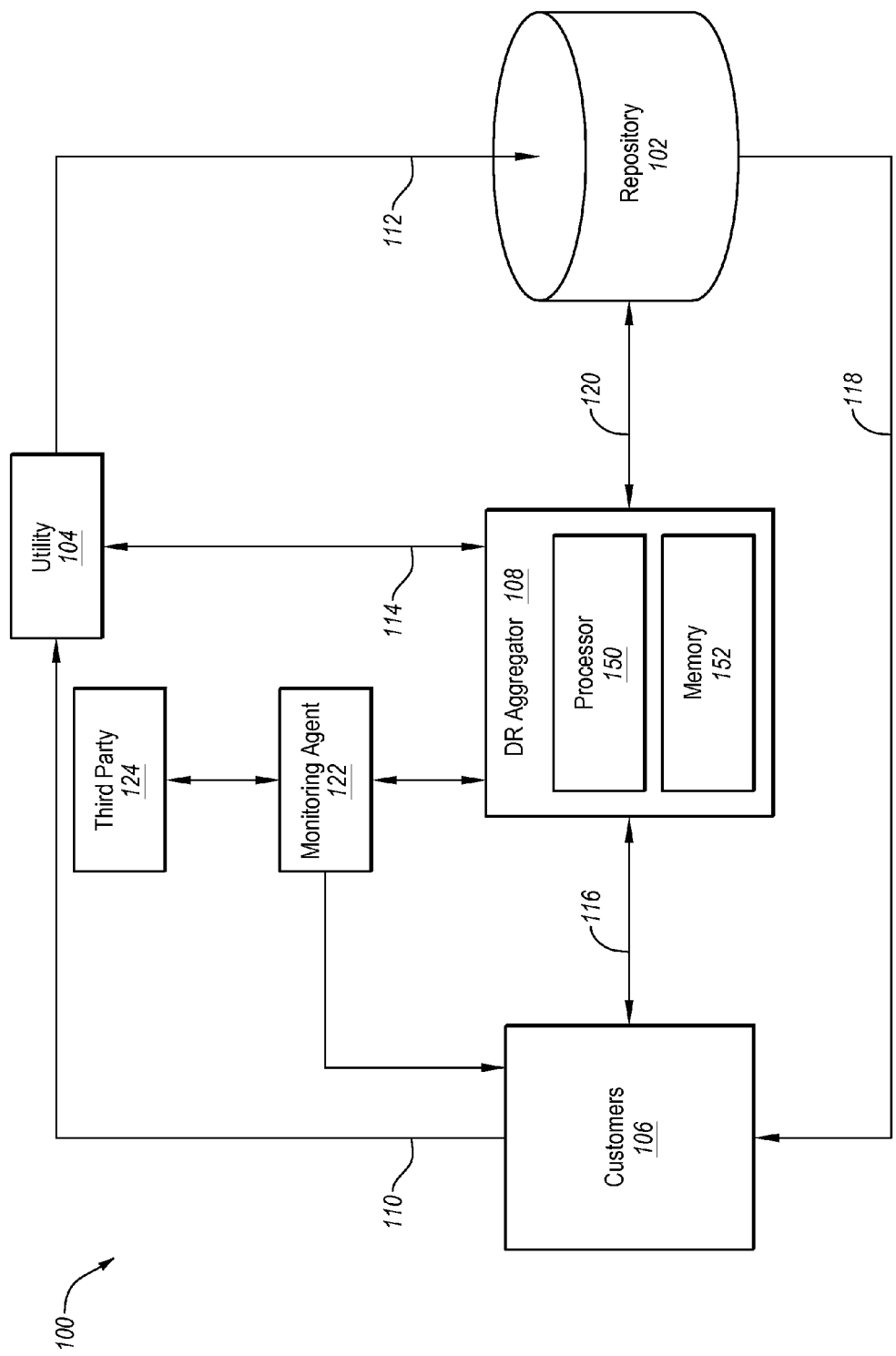
FIG. 1 illustrates a block diagram of an example customer-centric DR aggregation system (DR system) in which some embodiments described herein may be implemented.

The embodiments discussed herein are related to a customer-centric sharing of energy usage data. In an example embodiment of a demand response (DR) system, customers communicate energy usage data (e.g., meter readings) to a utility. The energy usage data is entered into original customer-specific energy usage data (CSEUD) record, which may be formatted according to a redactable signature scheme such as a Merkle hash tree. The Merkle hash tree is generally a mechanism used to calculate the root hash value. In particular, the CSEUD record may include energy usage data, which may be treated as leaf nodes of the Merkle hash tree, a signature of the utility on the root hash value of the Merkle hash tree, and hash values corresponding to one or more redacted portions of the energy usage data. The Merkle hash tree itself may not be transferred within the DR system, but instead used to calculate the root hash value, which may be used to authenticate the energy usage data. The original CSEUD record is then stored in a repository owned and/or managed by a customer.

When a DR event is anticipated or approaching, a DR aggregator communicates a notification to the customers indicating the duration, curtailment requirements, etc. of the DR event. The customers continue to generate energy usage data, which is entered into original CSEUD records. Prior to submitting the original CSEUD record to the DR aggregator, the customers can access and modify the original CSEUD records. For example, the customers may redact data items included in the original CSEUD record to generate a modified CSEUD record. The modified CSEUD record may be modified by the customers and thereby control data provided to the DR aggregator. However, the modified CSEUD record may maintain sufficient data to enable the DR aggregator to assess compliance of the customers with the DR event and/or to assess performance of the customers, such as actual energy curtailment during the DR event. Based on compliance and/or performance of the customer, the customers may receive incentives. Additionally, the modified CSEUD record enables the modifications by the customers but does not enable the customers to alter or otherwise forge the data used to assess compliance with the DR event and/or performance of the customer. The customer may accordingly control the amount and content of information in the modified CSEUD record but may not harm the integrity or accuracy of the data used to assess compliance of the customers with the DR event.

A benefit of this and other embodiments described herein may include a reduction in a number of metering devices (e.g., utility meters, smart meters, and the like) installed at customers' residences or places of business. The energy usage data may be sufficiently recorded using a metering devices installed by the utility rather than the DR aggregator installing a separate and/or independent metering devices at customers' residences or places of business. That is, a signature of the utility and hash values included in a redactable signature scheme such as the Merkle hash tree may be sufficient for verification of the energy usage data without an independent measurement by the DR aggregator. Some additional embodiments of the present disclosure will be explained with reference to the accompanying drawings.

FIG. 1 illustrates a block diagram of an example customer-centric DR aggregation system (DR system) 100, in accordance with at least one embodiment described herein. The DR system 100 may be implemented to provide information pertaining to DR events from a utility 104 to customers 106, which may be delivered to the customers 106 directly from the utility 104 or via a DR aggregator 108. The DR system 100 may also be configured to assess the customers' 106 compliance with the DR event and/or performance of the customers 106. The DR system 100 may be configured to operate within and/or support any DR event system and/or any DR program. For example, the DR system 100 may operate within and/or support a capacity bidding program (CBP) or a demand bidding program (DBP).

Although some embodiments are described in detail with respect to the DR system 100, it may be understood with the benefit of this disclosure that one or more of the functionalities of one of more embodiments may be implemented in other data-sharing applications and/or other data-sharing systems. For example, some embodiments may be implemented in general energy data sharing or utility systems or in another system in which customer privacy may be a concern and/or data redaction may otherwise provide some benefit.

The DR system 100 may further enable the customers 106 to control information conveyed to a DR aggregator 108. Accordingly, the customers 106 may only convey the minimal amount of information used to assess compliance with the DR event and/or performance of the customers 106. By enabling the customers 106 to control the energy usage data conveyed to the DR aggregator 108, privacy interests of the customers 106 may be protected. However, the DR system 100 limits the control of the customers 106 such that integrity and authenticity of the information is maintained.

The information communicated from the customers 106 may generally be referred to as energy usage data. In the DR system 100, the energy usage data may be first communicated from the customers 106 to the utility 104. Each customer included in the customers 106 may communicate individual energy usage data, as energy use of each customer may be independently assessed. The customers 106 may be any customer of a utility 104 including commercial and/or residential customers. The utility 104 may include any utility company, public or private, that supplies a public service. In the DR system 100 the utility 104 may include a power company, for instance.

In some circumstances, the customer 106 trusts the utility 104 with collection of the energy usage data. For example, in protocols that may be used to communicate energy usage data such as Green Button, the customers 106 trust the utility 104 in collection of energy usage data. Additionally, the utility 104 has an interest in receiving the energy usage data because payment for energy provided to the customers 106 may be based on the energy usage data. Accordingly, the energy usage data communicated from the customers 106 to the utility 104 may be referred to as original energy usage data because the original energy usage data may include a complete and unmodified set of energy usage data. The communication of original energy usage data from the customer 106 to the utility 104 is indicated by arrow 110 in FIG. 1. Generally, communication of energy usage data throughout the DR system 100 and between components or entities (e.g., 104, 102, 108, 122, 124, and 106) may be performed in plaintext or in a protected manner. The protected manner may protect confidentiality and/or integrity of the energy usage data.

In some embodiments, the original energy usage data may be measured by a metering device (not shown), which may be installed at residences or places of business of the customers 106 by the utility 104. The metering devices may include time-measuring components such that the original energy usage data may be measure as a function of or in relationship to time. For example, the original energy usage data may show energy use by the customers 106 at each minute. Generally, the original energy usage data measured by the metering devices is of a sufficiently small interval to allow assessment of compliance with a DR event and/or performance of the customers 106.

In some embodiments, the metering devices may organize or otherwise format the original energy storage data into an original CSEUD record. Additionally or alternatively, the utility 104 may receive the original energy storage data and organize or otherwise format the original energy storage data into an original CSEUD record.

The utility 104 may then communicate the original energy usage data and/or the original CSEUD record to a repository 102. The repository 102 may include any suitable storage medium in which the original energy usage data and/or the original CSEUD record may be stored, accessed by the customers 106, modified, and accessed by the DR aggregator 108. For example, the repository 102 may be hosted on personal computers of the customers 106 and/or may be hosted on a third party system such as trusted third party server or a cloud network. The repository 102 may be configured to receive an original CSEUD record and/or original energy usage data from the utility 104. The communication of the original energy usage data and/or the original CSEUD record to the repository 102 is represented in FIG. 1 by arrow 112.

The utility 104 may additionally communicate a DR event or information pertaining thereto to the DR aggregator 108. Additionally or alternatively, the DR aggregator 108 may submit a DR event including curtailment commitment to the utility 104. The communication between the utility 104 and DR aggregator 108 is represented in FIG. 1 by arrow 114.

The DR aggregator 108 may then communicate a notification of a DR event to the customers 106. The notification of a DR event may include information related to the DR event such an incentive, a time period of the DR event, individual curtail commitments, etc. In some embodiments, the customers 106 may opt into or opt out of the DR event. Accordingly, in these and other embodiments, the customers 106 may respond to the notification of the DR event communicated by the DR aggregator 108. The communication of the notification of a DR event is represented in FIG. 1 by arrow 116.

As shown in FIG. 1, the DR aggregator 108 communicates the notification of a DR event to the customers 106. This communication is not meant to be limiting. In some embodiments, the notification of a DR event may be communicated from the utility 104 to the customers 106 or via one or more intermediary entities (not shown). For example, the notification of a DR event may be communicated directly to a first subset of the customers 106 from the utility 104, may be communicated to a second subset of the customers 106 from the DR aggregator 108, and may be communicated to a third subset of customers 106 via one or more intermediary entities that may or may not include the DR aggregator 108.

During the DR event, energy usage of the customers 106 may be recorded as describe above and stored on the repository 102. The customers 106 may access the original CSEUD record and/or the original energy usage data stored in the repository 102. The customer may generate a modified CSEUD record or generate modified energy usage data. The modified CSEUD record or modified energy usage data may be derived from the original CSEUD record and/or the original energy usage data. For example, to generate the modified CSEUD record and/or the modified energy usage data, the customers 106 may redact energy usage data items included in the original CSEUD record and/or the original energy usage data.

The modified CSEUD record and/or the modified energy usage data may include redacted energy usage data. However, the modified CSEUD record and/or the modified energy usage data may contain sufficient information to allow assessment of compliance with the DR event by the customer 106 and/or performance of the customers 106. Additionally, the modified CSEUD record may maintain the integrity of the data received by the DR aggregator 108 and include verification that the customers 106 did not change data used to assess compliance with the DR event and/or performance of the customers 106. For example, the energy usage data that is redacted may pertain to energy usage data during a time period outside the DR event.

In some embodiments, the DR aggregator 108 or another party, such as the utility 104 can offer one or more tools to facilitate the generation of the modified CSEUD record and/or the modified energy usage data. For example, the tools may provide one or more pre-configured privacy options that the customers 106 may select. Once selected, the tool may automatically generate the modified CSEUD record and/or the modified energy usage data.

Additionally, the tools may include a user interface in which the original CSEUD record and/or the original energy usage data may be visualized. With this tool, the portions of the modified CSEUD record and/or the modified energy usage data communicated to the DR aggregator 108 may be viewable. The access of the original CSEUD record and/or the original energy usage data by the customers 106 is represented in FIG. 1 by arrow 118.

Following the DR event or concurrently with the notification of the DR event, the DR aggregator 108 may communicate a CSEUD record request to the customers 106. In embodiments in which the customers 106 may opt into or opt out of the DR event, the DR aggregator 108 may communicate the CSEUD record request to the customers 106 that opted into the DR event. The communication of the CSEUD record request to the customers 106 is also represented in FIG. 1 by the arrow 116.

The DR aggregator 108 may be configured to access a modified CSEUD record and/or modified energy usage data from the repository 102. In some embodiments, the customers 106 may grant access to the DR aggregator 108 in advance to a repository 102 hosted on a personal computer of the customers 106. Alternatively, the customers 106 may grant access to a portion of the repository 102 allocated to the customers 106. The access of the DR aggregator 108 of the modified CSEUD record and/or modified energy usage data from the repository 102 is represented in FIG. 1 by arrow 120.

In some embodiments, the customers 106 may enable access by the DR aggregator 108 to a portion of the modified CSEUD record and/or modified energy usage data from the repository 102 that is relevant to the DR event. For example, the customers 106 may release a modified CSEUD record and/or modified energy usage data from a time period corresponding to the DR event.

The DR aggregator 108 may be further configured to authenticate the modified CSEUD record and/or the modified energy storage data. Authentication of the modified CSEUD record and/or the modified energy storage data may include verification that the customers 106 did not change data used to assess compliance with the DR event and/or performance of the customers 106. For example, to generate a modified CSEUD record, the customers 106 may redact data items. However, the customers 106 cannot simple erase data indicating that the customers 106 did not comply with curtailment conditions of the DR event. The DR aggregator 108 may be further configured to assess compliance of the customers 106 with the DR event based on the modified CSEUD record and/or the modified energy storage data.

For example, in some embodiments, the DR aggregator 108 may be configured to authenticate the modified CSEUD record and/or the modified energy storage data by verifying a signature of the utility 104 and reconstructing a redactable digital signature scheme. Some additional details of the redactable digital signature scheme are provided herein.

In some embodiments, to assess compliance of the customers 106 with the DR event and/or performance of the customers 106, the DR aggregator 108 may additionally request past usage data. The past usage data may provide context to the curtailment commitments made by the customers 106. The past usage data may include long term energy usage data that may be averaged over a specific period of time. The past usage data may also be accessible via the repository 102. Additionally or alternatively, access to the past usage data may accessible at the control of the customers 106. For example, the customers 106 may modify the past usage data to reduce or eliminate privacy issues that may be included in the past usage data.

The DR aggregator 108 may receive the past usage data. The DR aggregator 108 may base the assessment of compliance of the customers 106 on the modified CSEUD record, the modified energy storage data, the past usage data, or some combination thereof.

Additionally, the original energy usage data may include, but is not limited to, an amount of energy used during specific periods of time and electrical signals specific to the energy used. The electrical signals may present privacy concerns because some electrical devices may be identified from the electrical signals. Accordingly, the electrical signals may be valuable to third parties such as consumer product marketing companies. For example, from the original energy usage data, it may be determined which electrical devices are being used by the customers 106, for how long the electrical devices are used, and when the electrical devices are being used.

In some embodiments, the DR aggregator 108 and/or the utility 104 may offer an incentive in exchange for including increasing amounts of the original energy usage data in the modified CSEUD record. The customers 106 may select the incentive for each DR event or may select to include increasing amounts of the original energy usage data throughout the relationship with the DR aggregator 108 and/or the utility 104. For example, as mentioned above, a pre-configured privacy option may be selected by the customers 106. Providing the DR aggregator 108 and/or the utility 104 with more information may increase the incentive but may lower privacy. In the DR system 100, the balance between privacy and incentive may be determined by the customers 106.

Moreover, in some embodiments, the modified energy usage data and/or the modified CSEUD record may be formatted such that the customers 106 are notified when the energy usage data is communicated to a third party 124. For example, the modified energy usage data and/or the modified CSEUD record may be embedded with an accountability tag when the modified energy usage data and/or the modified CSEUD record are stored in the repository 102. The access to the modified energy usage data and/or the modified CSEUD record by the DR aggregator 108 may not remove the accountability tag. In some embodiments, a monitoring agent 122 may be included in the DR system 100 to monitor whether the modified energy usage data and/or the modified CSEUD record including the accountability tag is communicated to the third party 124. When a third party communication is detected, the monitoring agent 122 may communicate a notification to the customers 106. Some additional details of accountability tags and a monitoring agent (e.g., the monitoring agent 122) may be found in Daisuke Mashima & Mustaque Ahamad, *Enabling Robust Information Accountability in E-healthcare Systems*, In Proc. of the 3rd USENIX Workshop on Health Security and Privacy (HealthSec 2012), Bellevue, Wash., 2012, which is incorporated herein by reference in its entirety.

In this and other embodiments, the DR aggregator 108 may also include a processor 150, which may be coupled to memory 152. The processor 150 may include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor 150 may interpret and/or execute program instructions and/or process data stored in the memory 152.

The memory 152 may include any suitable computer-readable media configured to retain program instructions and/or data for a period of time. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disk Read-Only Memory (CD-ROM), or other optical disk storage, magnetic disk storage or other magnetic storage devices, flash memory devices (e.g., solid state memory devices), a specific molecular sequence (e.g., DNA or RNA) or any other storage medium which may be used to carry or store desired program code in the form of computer-executable instructions or data structures and which may be accessed by the processor 150. Combinations of the above may also be included within the scope of computer-readable media. Computer-executable instructions may include, for example, instructions and data that cause a general purpose computer, special purpose computer, or special purpose processing device (e.g., the processor 150) to perform a certain function or group of functions.

In some embodiments, the system 100 may communicate energy usage data, etc. using one or more standard energy information protocols (standard protocols). The standard protocols may provide a format of the energy usage data communicated throughout the DR system 100, provide a format of the notification of a DR event, or provide a data model for energy usage data exchange, for instance. To enable one or more of the functionalities described herein, a modified energy information protocol (modified protocol) may be derived or based upon the standard protocol. For example, the standard protocol may include an open automated demand response (ADR) communication protocol such as OpenADR and/or an energy data scheme such as Green Button. Accordingly, the modified protocol may include a modified OpenADR protocol and/or a modified Green Button protocol.

The modified protocol (e.g., the modified OpenADR protocol and/or the modified Green Button protocol) may be used to perform communications between one or more of the components or entities (e.g., 102, 104, 106, and 108) in FIG. 1 or may be used to format the energy usage data that is communicated among the components or entities of FIG. 1. For example, in some embodiments, the utility 104 may communicate with the repository 102 using the modified protocol. Thus, the arrow 112 that represents communication between the utility 104 and the repository 102 may further represent communication using the modified protocol.

Additionally, in these and other embodiments, the repository 102 may be configured to communicate with the DR aggregator 108 using the modified protocol. Thus, the arrow 120 that represents communication between the DR aggregator 108 and the repository 102 may further represent communication using the modified protocol.

Further, in these and other embodiments, the DR aggregator 108 may communicate with the customers 106 using one or more standard protocols (e.g., the OpenADR protocol and/or the Green Button protocol). Thus, the arrow 116 that represents communication between the DR aggregator 108 and the repository 102 may further represent communication using the standard protocol.

The modified protocol may include a first extensible markup language (XML) schema configured to accommodate non-numeric values such as hash values that may be used in a redactable signature scheme. The modified protocol may include a second XML schema configured to accommodate a redactable signature such as a signature of the utility 104. As mentioned above, the signature of the utility 104 may be used to authenticate the modified CSEUD records and/or the modified energy usage data. Accordingly, in some embodiments, the modified CSEUD record and/or the modified energy usage data may be formatted according to the modified protocol.

Additionally, in some embodiments a first standard protocol may be used with a second modified second protocol. For example, a notification of a DR event may be communicated from the DR aggregator 108 to the customers 106 using the OpenADR protocol, while the communication of energy usage data between the utility 104, the customers 106, the repository 102, etc. may be performed using a modified Green Button communication protocol.

In some embodiments, to authenticate the modified CSEUD records, the modified CSEUD records may be structured in a redactable digital signature scheme, such as a Merkle hash tree. Some additional details of the Merkle hash tree are described elsewhere herein.

While some embodiments in which the Merkle hash trees are utilized are described in detail, inclusion of the Merkle hash trees is not meant to be limiting. One or more other redactable signature schemes may be implemented in one or more embodiments described herein. For example, the other redactable signature schemes may include any other suitable redactable signature scheme such as SUMI or PIATS as well as signature schemes using Chameleon hash. Some additional details of an example signature scheme using Chameleon hash may be found in Ateniese, Giuseppe, et al. "Sanitizable Signatures." Computer Security-ESORICS 2005. Springer Berlin Heidelberg, 2005, p. 159-177, which is incorporated herein by reference in its entirety. Some additional details of SUMI may be found in K. Miyazaki, S. Susaki, M. Iwamura, T. Matsumoto, R. Sasaki, H. Yoshiura, "Digital Documents Sanitizing Problem", The Institute of Electronics, Information and Communication Engineers (IEICE) technical report, ISEC 2003-20, May 2003, which is incorporated herein by reference in its entirety. Some additional details of PIATS may be found in Izu, Tetsuya, et al. "HATS: A partially Sanitizable Signature Scheme." Information and Communications Security. Springer Berlin Heidelberg, 2005. 72-83, which is incorporated herein by reference in its entirety.

Figure 2A:
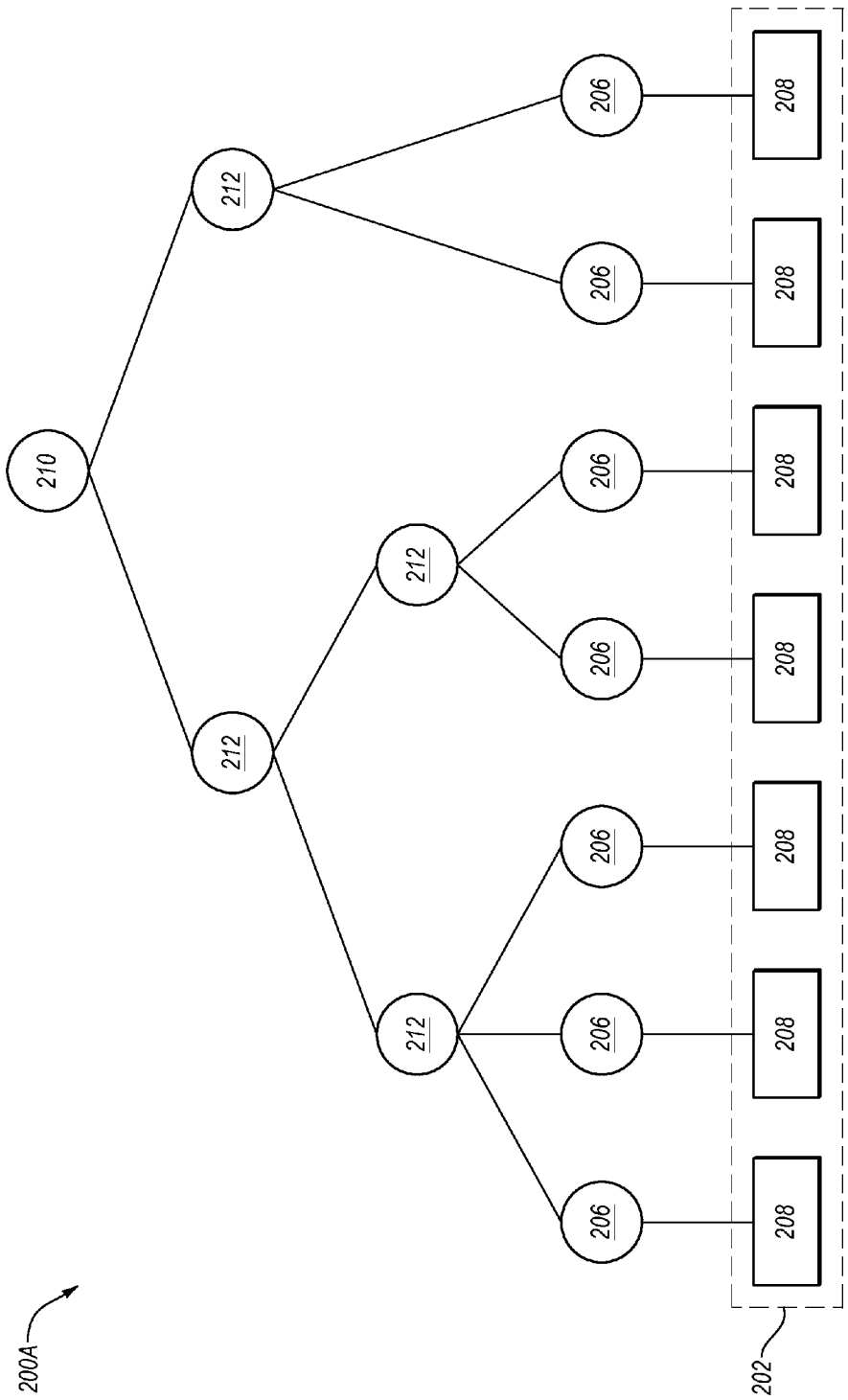
FIG. 2A illustrates an example original CSEUD record structured according to a Merkle hash tree which may be implemented in the DR system of FIG. 1.
Figure 2B:
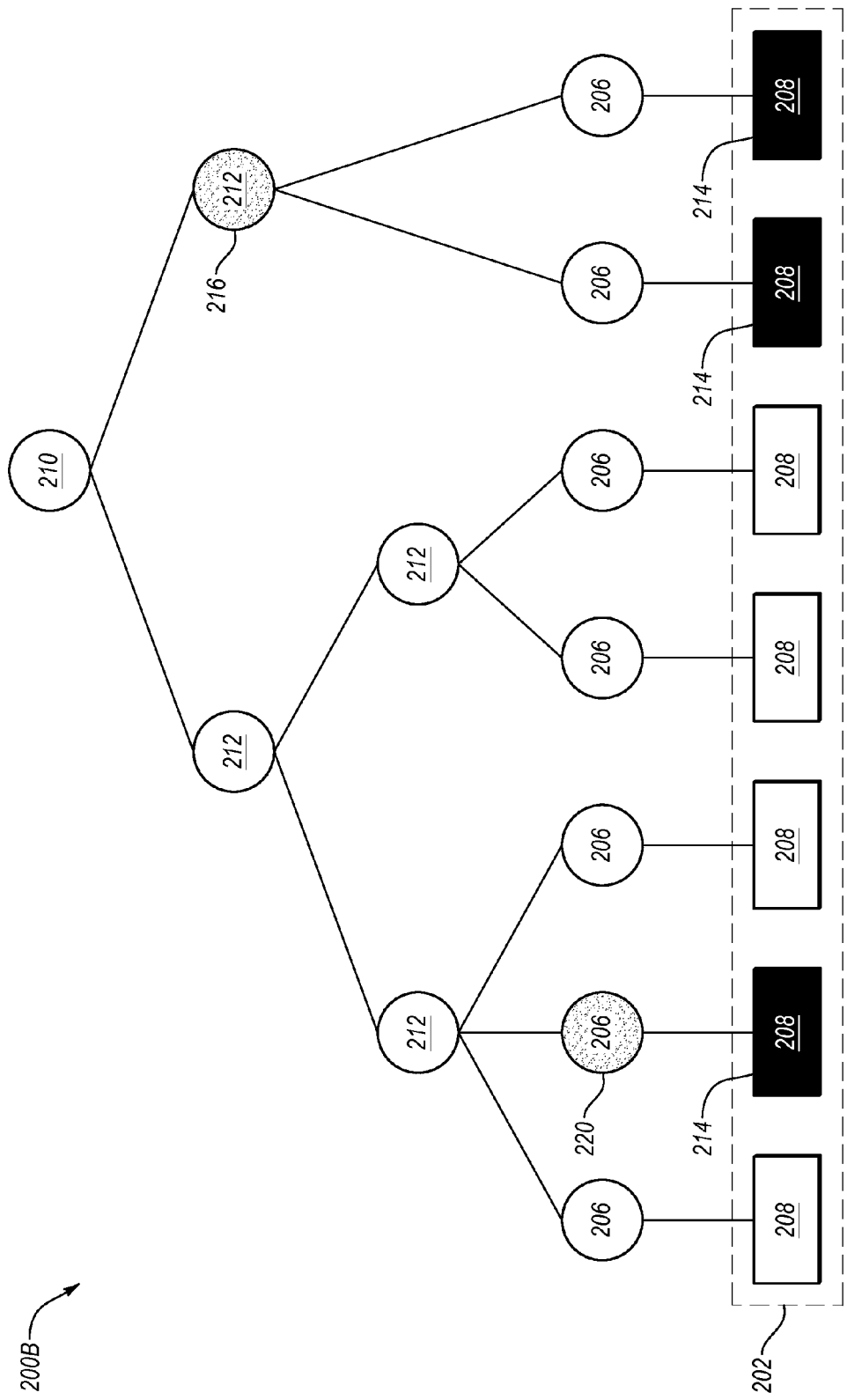
FIG. 2B illustrates an example modified CSEUD record structured according to a Merkle hash tree which may be implemented in the DR system of FIG. 1.

FIG. 2A illustrates an example original CSEUD record 200A structured according to a Merkle hash tree in accordance with at least one embodiment described herein. FIG. 2B illustrates an example modified CSEUD record 200B structured according to a Merkle hash tree in accordance with at least one embodiment described herein. As mentioned above the modified CSEUD record 200B may be derived from the original CSEUD record 200A. Using the Merkle hash tree, the modified CSEUD record 200B may be authenticated by a DR aggregator such as the DR aggregator 108 of FIG. 1. With reference to FIGS. 2A and 2B the modified CSEUD record 200B and the original CSEUD record 200A are referred to collectively as CSEUD records 200.

With combined reference to FIGS. 2A and 2B, the general structure of the CSEUD records 200 may include a root node 210, leaf nodes 208, a first level of intermediate nodes 206, and other intermediate nodes 212. The energy usage data 202 may be included as data items in the leaf nodes 208 of the Merkle hash tree. Additionally, a signature of the utility such as the utility 104 of FIG. 1 may be included with the Merkle hash tree. Each of the first level of intermediate nodes 206 may include a hash value assigned to its immediate child leaf node 208. Each of the other intermediate nodes 212 may include a hash value assigned to its immediate child intermediate node 206 or 212.

With specific reference to FIG. 2A, the original CSEUD record 200A includes all the data items (represented by leaf nodes 208). The original CSEUD record 200A may be signed by the utility. By signing, the utility may verify that the data items are authentic and/or properly represent the energy usage data of a customer.

With reference to FIG. 2B, in the modified CSEUD record 200B some of the data items (again represented by the leaf nodes 208) may have been modified. For instance, the data items may have been redacted. The modified data items are represented by blackened blocks 214. The data items that are redacted may prevent or reduce the likelihood that a DR aggregator may abstract private information therefrom.

The modified data items 214 may be data items that are not be used in assessment of compliance with a DR event and/or performance of the customer. Additionally or alternatively, the modified data items 214 may include data items that introduce a privacy concern to a customer.

The modified CSEUD record 200B may be generated by the customer directly or indirectly. With combined reference to FIGS. 1-2B, the customers 106 may redact the modified data items 214 by interfacing with the original CSEUD record 200A stored on the repository 102. The customers 106 may select data items to be modified. Additionally or alternatively, the modified data items 214 may result from application of a pre-configured privacy option selected by the customer 106.

Referring back to FIG. 2B, in the modified CSEUD record 200B the root node 210 and the intermediate nodes 206 and 212 may not be modified. Thus, authentication may be possible by verifying the signature of a utility and reconstructing the Merkle hash tree using the hash values in the root node 210 and each of the intermediate nodes 206 and 212. The redacted data items 214 may not need to be known because parent intermediate nodes 220 and 216 may be used to sufficiently reconstruct the Merkle hash tree to authenticate the modified CSEUD record 200B. In some embodiments, a secure hash function may be used to reconstruct the modified CSEUD record 200B using the hash values of the intermediate nodes 206 and 212.

Figure 3:
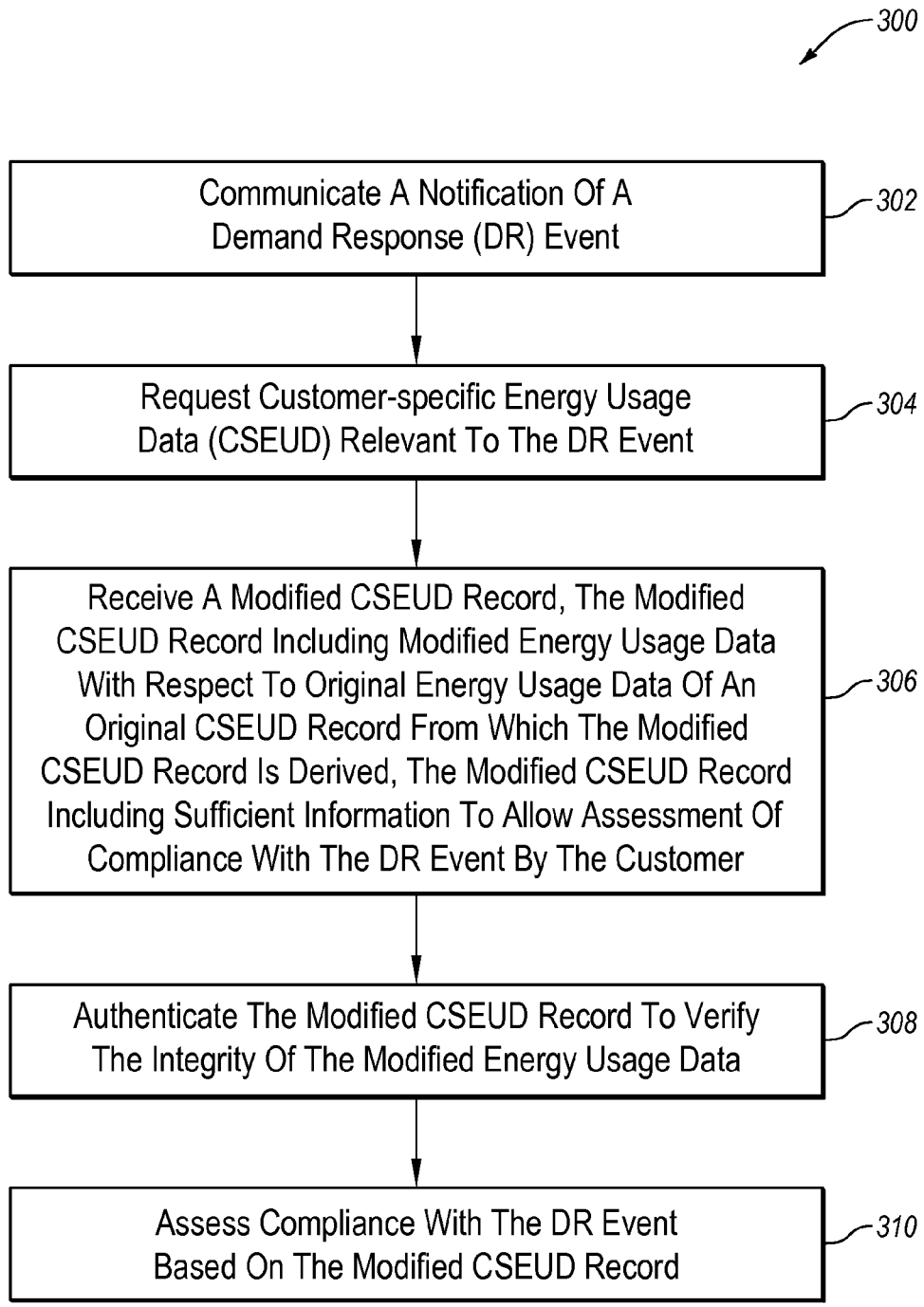
FIG. 3 is a flow diagram of an example method of sharing energy usage data, in accordance with at least one embodiment described herein.

FIG. 3 is a flow chart of an example method 300 of energy usage data sharing in accordance with at least one embodiment described herein. The method 300 may be implemented, in some embodiments, by a DR aggregator operating in a DR system, such as the example DR aggregator 108 operating in the example DR system 100 of FIG. 1. For example, the DR aggregator 108 of FIG. 1 may be configured to execute computer instructions to perform operations of assessing compliance with the DR event as represented by one or more of blocks 302, 304, 306, 308, and/or 310 of the method 300. Although illustrated as discrete blocks, various blocks may be divided into additional blocks, combined into fewer blocks, or eliminated, depending on the desired implementation. The method 300 will now be discussed with reference to FIG. 3.

Although the method 300 is described in detail with respect to FIG. 3 in the context of a DR event, it may be understood with the benefit of this disclosure that one or more of the steps and/or one of more embodiments of the method 300 may be implemented in other data-sharing applications and/or other data-sharing systems. For example, some embodiments may be implemented in general energy usage data sharing in a utility system or in another systems in which customer privacy may be an concern and/or data redaction may otherwise provide some benefit.

At 302, the method 300 may begin with a notification of a DR event being communicated. For example, a DR aggregator may communicate the notification of the DR event to one or more customers. Additionally, in some embodiments, the customers may be enabled to opt-out of participating in the DR event. An opt-out response may be communicated to the DR aggregator in response to the notification of the DR event. At 304, a CSEUD is requested. The CSEUD that is requested may be relevant to the DR event. In some embodiments, a request for CSEUD may be communicated concurrently with the notification of the DR event. Alternatively, the request for CSEUD may be communicated following or during the DR event.

At 306, a modified CSEUD record is received. The modified CSEUD record may include modified energy usage data with respect to original energy usage data of an original CSEUD record from which the modified CSEUD record is derived. The modified CSEUD record may include sufficient information to allow assessment of compliance with the DR event by the customer and/or performance of the customer. In some embodiments, the modified energy usage data of the modified CSEUD record modifies at least a portion of the original energy usage data. For example, the modified CSEUD record includes redacting data items included in the original energy usage data.

Additionally or alternatively, the modified CSEUD record may be received from a repository. The repository may be hosted on a personal computer of each of the customers or hosted on a third party, such as a trusted third party server or a cloud network.

Additionally, in some embodiments, the modified CSEUD record may be configured according a pre-configured privacy option selected by each of the customers. The pre-configured privacy option may redact certain data items of the original energy usage data.

At 308, the modified CSEUD record is authenticated to verify the integrity of the modified energy usage data. In some embodiments, the modified CSEUD record may be organized according to redactable digital signature scheme such as a Merkle hash tree. The redactable digital signature scheme may include a signature of the utility, a root node, and leaf nodes that include data items of the energy usage data.

In these and other embodiments, authenticating the modified CSEUD record may include verifying that a signature of the utility and reconstructing the Merkle hash tree. The reconstruction of the Merkle hash tree may be performed without the redacted original energy usage data.

At 310, compliance with the DR event is assessed based on the modified CSEUD record. Additionally, in some embodiments an incentive may be offered in exchange for including increasing amounts of the original energy usage data in the modified CSEUD record.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instance, the method 300 formatting the energy usage data such that a customer is notified with the energy usage data is communicated to a third party. For example, the energy usage data may include an accountability tag that a monitoring agent detects when the energy usage data is communicated to a third party. The monitoring agent may then communicate a notification to a customer that generated the energy usage data.

Embodiments described herein may include a tangible and/or non-transitory computer-readable medium having encoded therein programming code executable by a processing device to perform the method 300 of FIG. 3 and/or variations thereof. The processing device may be included in the DR aggregator 108 of FIG. 1, for example.

The embodiments described herein may include the use of a special purpose or general-purpose computer including various computer hardware or software modules, as discussed in greater detail below.

As indicated above, some embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions may include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
requesting, by a demand response (DR) aggregator, customer-specific energy usage data (CSEUD), the requested CSEUD being from a time period corresponding to a DR event;
receiving, by the DR aggregator, a modified CSEUD record, the modified CSEUD record formatted according to a redactable digital signature scheme in which at least one customer-selected energy usage data item is redacted from original energy usage data of an original CSEUD record that is measured by a metering device;
authenticating, by the DR aggregator, the modified CSEUD record to verify the integrity of modified energy usage data, the authenticating including verifying a signature of a utility on the modified CSEUD record and determining whether the modified CSEUD record includes sufficient energy usage data items to allow assessment of compliance with the DR event by the customer; and
in response to authentication of the modified CSEUD record, assessing, by the DR aggregator, compliance of a customer associated on the modified CSEUD record with the DR event based on the energy usage data items of the modified CSEUD record.

2. The method of claim 1, further comprising organizing the modified CSEUD record according to a Merkle hash tree in which data items of the energy usage data are leaf nodes and that includes a signature of the utility.

3. The method of claim 1, wherein:
the modified CSEUD record is organized according to a Merkle hash tree; and
the authenticating includes verifying a signature of the utility and reconstructing the Merkle hash tree without the redacted original energy usage data.

4. The method of claim 1, further comprising offering an incentive in exchange for including increasing amounts of the original energy usage data in the modified CSEUD record.

5. The method of claim 1, wherein the modified CSEUD record includes an accountability tag configured to enable monitoring of communications of a portion of the modified CSEUD record to a third party.

6. The method of claim 1, wherein the modified CSEUD record is received from a repository, the repository being hosted on a personal computer of the customer or hosted by a third party.

7. The method of claim 1, wherein the modified CSEUD record is configured according a pre-configured privacy option selected by the customer.

8. A system comprising:
a repository communicatively coupled with a utility, a customer, and a demand response (DR) aggregator, the repository configured to receive an original customer-specific energy usage data (CSEUD) record from the utility and to enable performance of a modification of the original CSEUD record; and
the DR aggregator communicatively coupled to the utility, the customer, and the repository, the DR aggregator configured to:
communicate a DR event associated with a DR program and a CSEUD record request to the customer wherein the requested CSEUD is from a time period corresponding to a DR event;
access a modified CSEUD record from the repository, the modified CSEUD record formatted according to a redactable digital signature scheme in which at least one customer-selected energy usage data item is redacted from original energy usage data of an original CSEUD record that is measured by a metering device;
authenticate the modified CSEUD record to verify the integrity of modified energy usage data, wherein authentication of the CSEUD record includes a verification of a signature of the utility on the modified CSEUD record and a determination whether the modified CSEUD record includes sufficient energy usage data items to allow assessment of compliance with the DR event by the customer; and
in response to authentication of the modified CSEUD record, assess compliance of the customer with the DR event based on the modified CSEUD record based on the energy usage data items of the modified CSEUD record.

9. The system of claim 8, wherein the original CSEUD record is organized in a redactable digital signature scheme including a root node, leaf nodes including data items of the energy usage data, a first level of intermediate nodes each having a hash value assigned to a corresponding leaf node, other intermediate nodes each having a hash value identifying nodes in an immediately lower level, and a signature of the utility.

10. The system of claim 9, wherein the DR aggregator is configured to authenticate the modified CSEUD record by verifying the signature of the utility is included in the redactable digital signature scheme and reconstructing the redactable digital signature scheme.

11. The system of claim 8, wherein the DR program includes one or more of a capacity bidding program (CBP) and a demand bidding program (DBP).

12. The system of claim 8, wherein:
the utility communicates with the repository using a modified energy information protocol;
the repository communicates with the DR aggregator using the modified energy information protocol; and
the DR aggregator communicates with the customers using a standard energy information protocol,
wherein the modified energy information protocol includes a first extensible markup language (XML) schema configured to accommodate non-numeric values and a second XML schema configured to accommodate a signature of the utility.

13. The system of claim 12, wherein:
the standard energy information protocol includes one or more of OpenADR protocol and Green Button protocol; and
the modified energy information protocol includes one or more of a modified OpenADR protocol and a modified Green Button protocol.

14. A non-transitory computer-readable medium having encoded thereon programming code executable by one or more processors to perform operations comprising:
requesting, by the one or more processors, customer-specific energy usage data (CSEUD), the requested CSEUD being from a time period corresponding to a demand response (DR) event;
receiving, by the one or more processors, a modified CSEUD record, the modified CSEUD record formatted according to a redactable digital signature scheme in which at least one customer-selected energy usage data item is redacted from original energy usage data of an original CSEUD record that is measured by a metering device;

authenticating, by the one or more processors, the modified CSEUD record to verify the integrity of modified energy usage data, the authenticating including verifying a signature of a utility on the modified CSEUD record and determining whether the modified CSEUD record includes sufficient energy usage data items to allow assessment of compliance with the DR event by the customer; and in response to authentication of the modified CSEUD record, assessing, by the one or more processors, compliance with the DR event based on the modified CSEUD record with the DR event based on the energy usage data items of the modified CSEUD record.

15. The non-transitory computer-readable medium of claim 14, wherein the modified CSEUD record is formatted according to a modified energy information protocol including a first extensible markup language (XML) schema configured to accommodate hash values and a second XML schema configured to accommodate a redactable signature of the utility.

16. The non-transitory computer-readable medium of claim 14, wherein the operations further include formatting the energy usage data such that a customer is notified with the energy usage data is communicated to a third party.

* * * * *